United States Patent [19]

Goff et al.

[11] Patent Number: 4,616,137

[45] Date of Patent: Oct. 7, 1986

[54] OPTICAL EMISSION LINE MONITOR WITH BACKGROUND OBSERVATION AND CANCELLATION

[75] Inventors: David R. Goff, Star City; John E. Notestein, Morgantown, both of W. Va.

[73] Assignee: The United States of America as represented by the United States Department of Energy, Washington, D.C.

[21] Appl. No.: 688,670

[22] Filed: Jan. 4, 1985

[51] Int. Cl.⁴ ........................................... G01N 21/00
[52] U.S. Cl. ................................... 250/554; 250/227; 340/577; 431/79
[58] Field of Search ....................... 250/226, 227, 554; 340/514, 578, 577; 356/43; 431/76, 79

[56] References Cited

U.S. PATENT DOCUMENTS 2,840,146  6/1958  Ray .................................. 250/554 X
3,146,822  9/1964  Ray .................................. 250/554 X
4,408,827 10/1983  Guthrie et al. .................... 356/43 X

*Primary Examiner*—Eugene R. LaRoche
*Assistant Examiner*—Robert J. Pascal
*Attorney, Agent, or Firm*—David E. Breeden; Stephen D. Hamel; Judson R. Hightower

[57] ABSTRACT

A fiber optics based optical emission line monitoring system is provided in which selected spectral emission lines, such as the sodium D-line emission in coal combustion, may be detected in the presence of interferring background or blackbody radiation with emissions much greater in intensity than that of the emission line being detected. A bifurcated fiber optic light guide is adapted at the end of one branch to view the combustion light which is guided to a first bandpass filter, adapted to the common trunk end of the fiber. A portion of the light is reflected back through the common trunk portion of the fiber to a second bandpass filter adapted to the end of the other branch of the fiber. The first filter bandpass is centered at a wavelength corresponding to the emission line to be detected with a bandwidth of about three nanometers (nm). The second filter is centered at the same wavelength but having a width of about 10 nm. First and second light detectors are located to view the light passing through the first and second filters respectively. Thus, the second detector is blind to the light corresponding to the emission line of interest detected by the first detector and the difference between the two detector outputs is uniquely indicative of the intensity of only the combustion flame emission of interest. This instrument can reduce the effects of interferring blackbody radiation by greater than 20 dB.

6 Claims, 5 Drawing Figures

OPTICAL EMISSION LINE MONITOR WITH BACKGROUND OBSERVATION AND CANCELLATION

BACKGROUND OF THE INVENTION

This invention relates generally to optical monitoring systems and more specifically to optical monitoring systems for enhancing combustion spectroscopy by reducing the interference caused by background radiation.

In various fossil energy processes which require controlled combustion of coal, for example, in special reactor vessels at elevated temperatures (2,000° to 3,000° F.) and pressures (100 to 1,000 psig), optical techniques offer a potential solution to many difficult monitoring problems. Optical methods offer noncontact, noninvasive sensing techniques that avoid many of the usual problems that are associated with high temperatures and pressures.

Various optical methods have been applied to fossil energy processes in recent years. These include techniques ranging from simple pyrometry to sophisticated laser diagnostic systems. However, these attempts to use optical instrumentation on fossil energy processes have been plagued, in varying degrees, by inadequate optical access to the combustion flame. In almost all cases, high temperature dictates the need for some means of cooling windows and/or instrumentation. Quartz windows are most often employed, but the radiative heat loss and cooling requirements can be large for even a moderate-size window. Also, the high pressures dictate the use of thick windows which further reduce optical access.

The field of fiber optics offers several advantages over conventional windows in this type of application. The small size and large light gathering capability of fiber optics along with their ability to allow sensitive detectors to be spaced some distance from the reactor vessel are the most notable features.

In order to apply optical instrumentation successfully to any process, the nature of the optical properties of the process must be well understood. In fossil energy applications, there have been only minimal efforts to characterize critical optical parameters such as spectral emission characteristics and optical depth. The collection of data to define these basic optical properties is an essential step for successful application of optical instrumentation.

Flame spectroscopy is a well-developed science, but the techniques that yield excellent results in a well-controlled laboratory burner are often worthless in a combustion environment. Assuming that the problem of optical access can be solved by the use of fiber optics, one still has to cope with intense thermal background or blackbody radiation from walls and entrained solid particles. The thermal radiation can be orders of magnitude more intense than the emission lines that are sought. Entrained solid particles can absorb some emissions and obscure the field of view as particles swirl in the view of the fiber optics. Rapidly fluctuating flames further complicate the problem. Measurements on a coal-water fuel (CWF) combustor reveal significant frequency components up to a few hundred hertz. Others have reported measuring frequency components at frequencies of 10 kHz or more.

Thus, there is a need for an optical monitoring system in which fiber optics can be employed and which overcomes the problems of flame emission monitoring as outlined above.

SUMMARY OF THE INVENTION

In view of the above need it is an object of this invention to provide an optical monitoring system in which a selected spectral emission line may be detected and measured in the presence of interferring background radiation.

Further, it is an object of this invention to provide a monitoring system as in the above object for combustion monitoring which employs fiber optics to view the combustion flame and transmit the light to be analyzed to a remote detecting system.

Other objects and many of the attendant advantages of the present invention will be apparent from the following detailed description of a preferred embodiment of the invention taken in conjunction with the drawings.

A technique has been developed that solves many of the problems outlined above. The technique is called BLOC (Blackbody Observation and Cancellation) used for enhancing the observation of an emission line in a combustion environment. BLOC is a general technique that may be applied to any part of the electromagnetic spectrum. The only requirement is that the emission line to be observed is reasonably spaced from other emission lines. In order to detect various emission lines from a combustion flame, for example, the instrument is designed so that it is "blind" to interferring blackbody (background) radiation.

In accordance with the invention, a system is provided which compensates for the amount of interferring blackbody radiation reaching the detector by subtracting out the amount of light generated by the background blackbody emitters. This is accomplished by assuming that the intensity of radiation, although highly nonlinear over broad ranges of wavelengths, is essentially linear over very small ranges of wavelengths. Light from a source being monitored is directed through one branch of a bifurcated fiber optic to a first detector through a first bandpass optical filter having a bandpass centered about the spectral line frequency to be detected. A second detector is provided at the other branch end of the bifurcated fiber optic to detect a portion of light reflected by the first filter back into the fiber optic common trunk portion through a second bandpass filter. The second filter has a bandpass centered about the same spectral line frequency but having a slightly broader bandpass width than the first filter to detect light from narrow regions on either side of the emission line being monitored. By proper adjustments of the gains of the first and second detector outputs and obtaining the difference between the outputs of the two detectors in a differencing circuit, a signal is produced which is proportional to only the intensity of the emission line from the source being monitored.

DETAILED DESCRIPTION OF THE PREFERRED EMBODIMENT OF THE INVENTION

Figure 1:
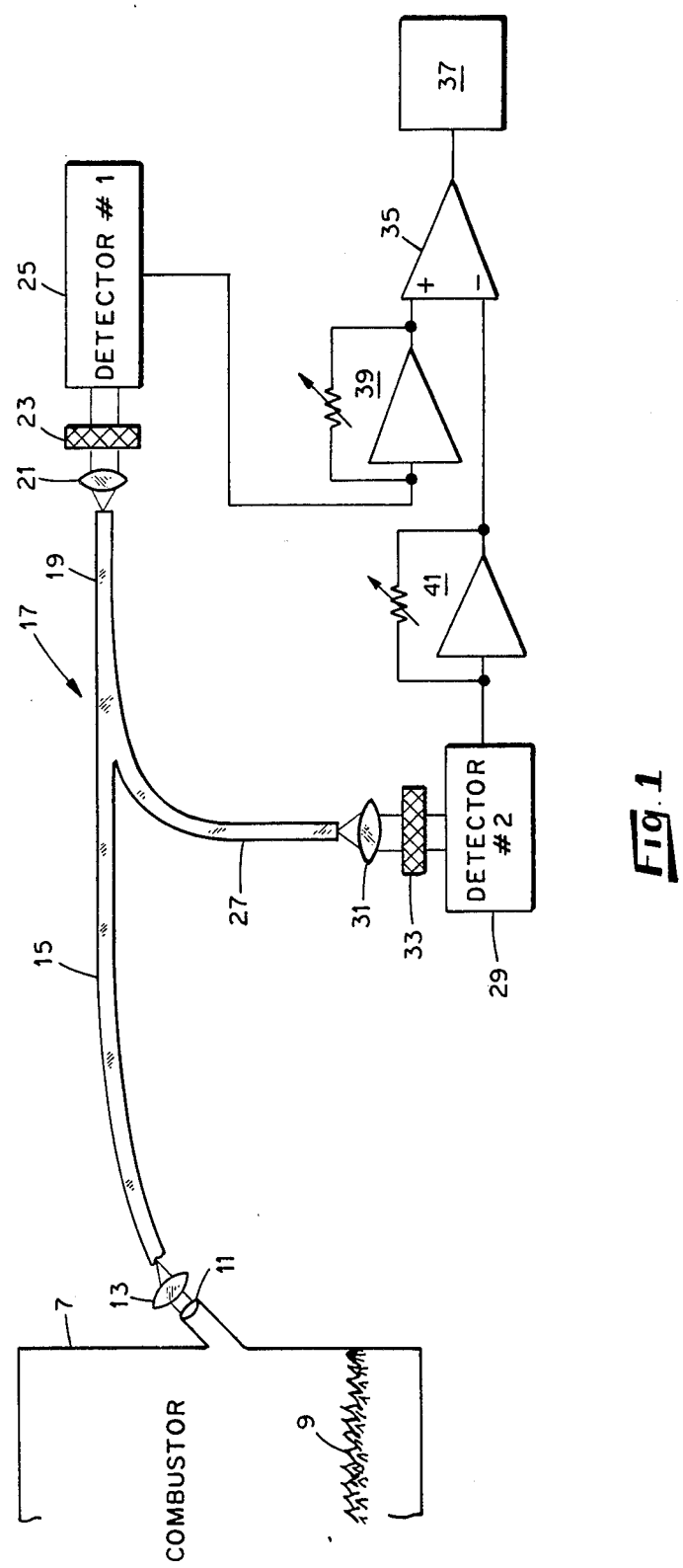
FIG. 1 is a schematic diagram of an optical combustion monitoring system with blackbody observation and cancellation according to the present invention.

Referring now to FIG. 1, the invention will be described by way of illustration of an optical combustion monitoring system for monitoring the sodium D-line emission from a coal combustor flame. The monitoring system may be used to determine when coal flow to a coal combustor 7 has been interrupted by monitoring the sodium D-line emissions of the flame. It is well known that this emission line is very strong and invariably present in coal combustion. The intensity of the line is strongly dependent on the number of free, ionized Na atoms and the temperature of the sample. If combustion is stopped due to an interruption of coal flow, for example, the emissions will drop off sharply.

To view the flame 9 in the combustor 7, a window 11 formed of quartz is provided in a wall of the combustor. A conventional focusing lens 13, such as a convex lens, is provided as a means of introducing the light from the flame into one end of a first branch of a bifurcated optical fiber cable 17. The fiber optic cable 17 is preferably a cable with randomized fiber ends in the common leg or trunk portion 19 to allow efficient pick-up of light reflected back into the cable, as will be explained hereinbelow. Further, it is preferred that the cable be formed of a material having a high melting point, such as quartz or other suitable material, due to the extreme heat generated by the combustor.

Figure 4:
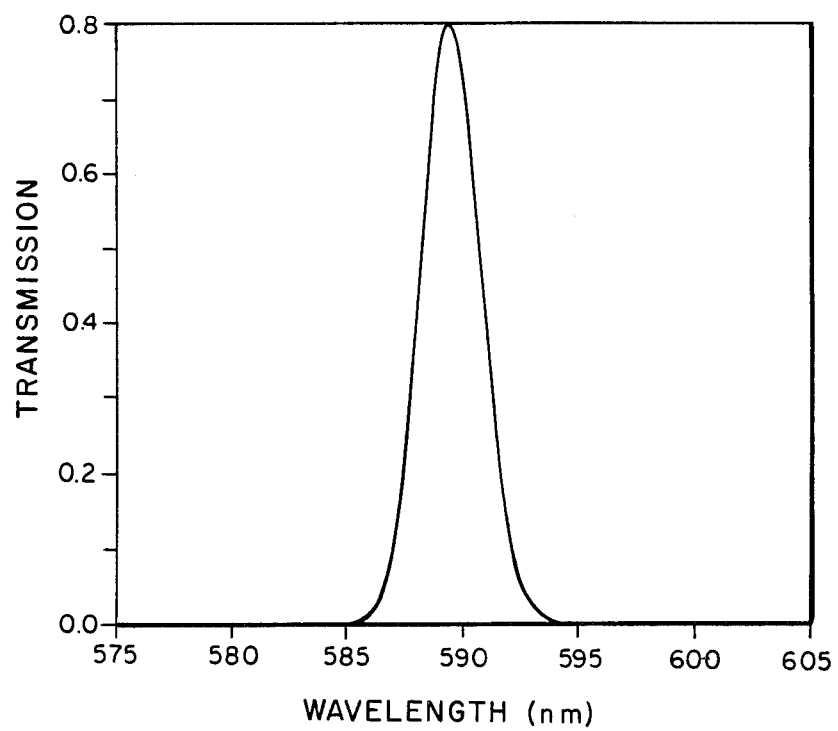
FIG. 4 is a plot of the typical response of detector 1 of FIG. 1 when monitoring the sodium D-line emission.

The light gathered by the branch 15 is directed through a lens onto a first filter 23. Filter 23 is a bandpass dichroic interference filter centered at a wavelength corresponding to the emission line being monitored, in this case centered at a wavelength of 589 nm to correspond to the sodium D-line wavelength. The filter 23 bandwidth, full-width half maximum (FWHM), is about 3 nm. Thus, the light with wavelengths from about 588 nm to 591 nm is transmitted by the filter to a first optical detector 25, such as a photodiode, which generates an output signal proportional to the total light power transmitted. FIG. 4 shows the typical sensitivity of the first detector (25) to the input light. The output of detector 25, therefore, consists primarily of the sodium D-line emission plus any corresponding frequency background radiation, which may be rather significant at high temperatures.

Figure 5:
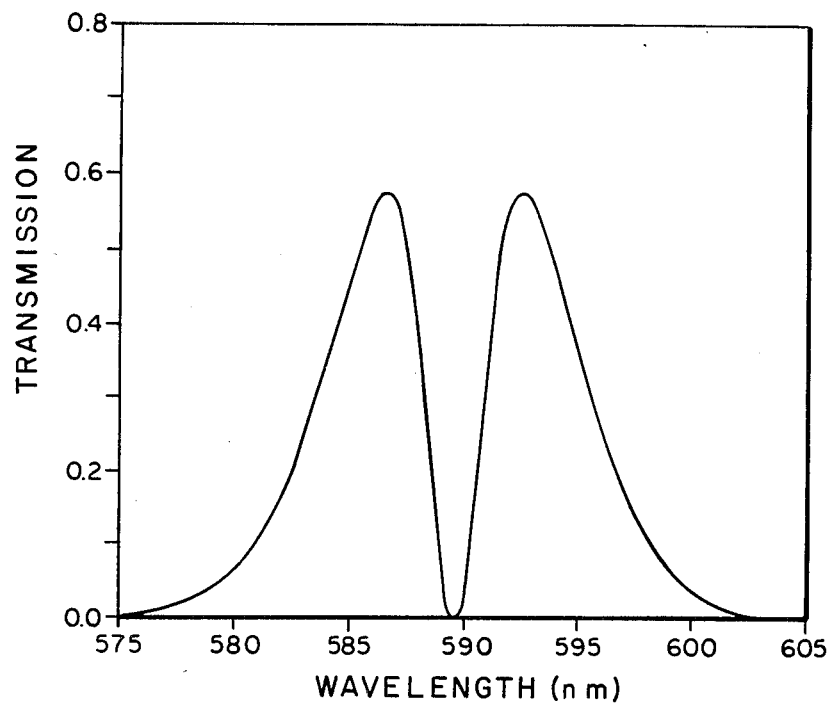
FIG. 5 is a plot of the typical response of detector 2 of FIG. 1 when monitoring the sodium D-line emissions.

The light that hits the first filter 23 outside the 588 nm to 591 nm region is reflected back into the optical fiber common trunk portion 19 through focusing lens 21 and divided between the incoming branch 15 and the second branch 27 of the bifurcated cable 17. A second detector 29 is disposed to view the reflected portion of the light passing through a focusing lens 31 and a second filter 33 from the optical cable branch 27. Filter 33 is also a bandpass dichroic interference filter with a center wavelength of 589 nm, but with a bandpass width of 10 nm FWHM. FIG. 5 shows the net response of detector 29 to input light. The response yields two bandpass regions from 585 nm to 588 nm and 591 nm to 595 nm.

Thus, the second detector is blind to the sodium D-line but sees the background radiation levels on both sides of the D-line, which also is representative of the undesired background component present in the output of the first detector (25). This undesirable blackbody radiation component is cancelled out of the first detector signal by obtaining the difference of the two detector outputs (No. 1 minus No. 2) in a differencing circuit, such as an instrument amplifier 35 having separate positive and negative inputs connected respectively to the outputs of detectors 25 and 29 through separate variable gain amplifiers 39 and 41, respectively. Thus, the output of amplifier 35 with appropriate gain adjustments, is a signal whose amplitude is proportional to the sodium D-line emissions of the flame in combustor 7. This output may be displayed on an appropriately calibrated voltmeter 37 connected to the output of amplifier 35 or used as a process control signal in the combustor coal feed system, for example.

As pointed out above, the basic idea behind the BLOC technique used to provide the desired sensitivity to a particular emission line is to measure only the intensity of the emission line, in this case, the sodium D-line, by subtracting out the amount of light generated by the background blackbody emitters.

Although the intensity of radiation from a thermal source is highly nonlinear, it is essentially linear over very small ranges of wavelengths as will be evident from the following discussion.

Equation 1 gives the classic form of Planck's Law which defines the distribution of radiation from a heated object:

$$W_B(\lambda,T) = \frac{37{,}450}{\lambda^5 \cdot G(\lambda,T)} \quad (1)$$

where $F(\lambda,T) = e^{14{,}388/\lambda T}$ $G(\lambda,T) = F(\lambda,T) - 1.0$ $W_B$ = Spectral radiant emittance (watts/cm$^2$. $\mu$m).
$\lambda$ = Wavelength in micrometers ($\mu$m).
$e$ = 2.7183
$T$ = Absolute temperature (°K.).

If Equation 1 is differentiated with respect to $\lambda$, the result shown in Equation 2 is obtained, which is the approximate slope of the linear region at a given and T.

$$\frac{dW_B(\lambda,T)}{d\lambda} = W_B(\lambda,T) \cdot \left[ \left( \frac{14{,}388 \cdot F(\lambda,T)}{\lambda^2 T \cdot G(\lambda,T)} \right) - \left( \frac{5}{\lambda} \right) \right] \quad (2)$$

Figure 2:
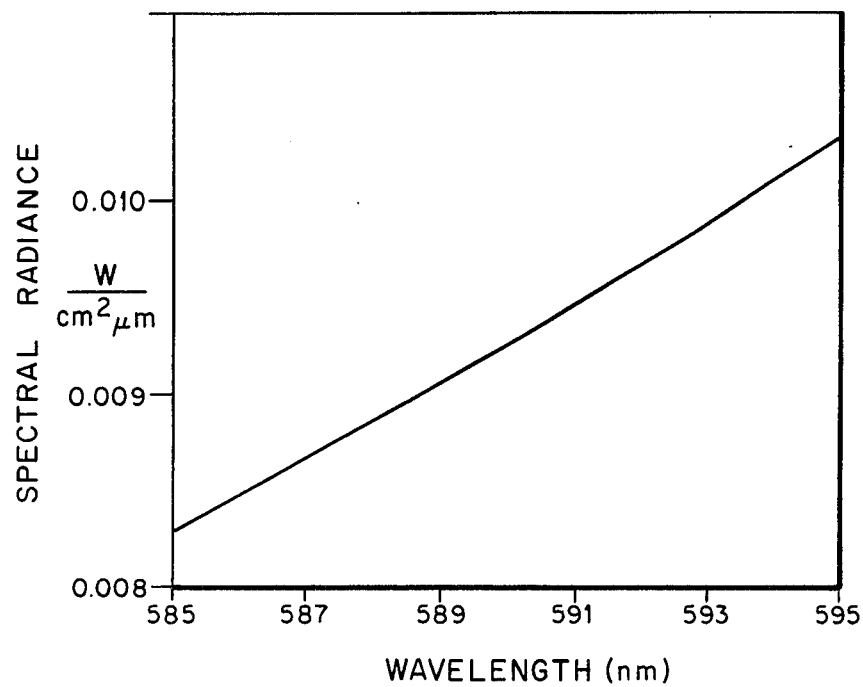
FIG. 2 is a graph of a narrow region of blackbody spectral radiance, which illustrates the substantially linear blackbody radiation intensity over a small wavelength range (585 to 595 nm)

This obviously becomes a very nonlinear function; however, as $d\lambda$ is made very small, a linear function becomes an acceptable approximation. FIG. 2 shows a plot of a small region of the blackbody spectral radiance as defined by Equation 1. This plot represents a blackbody at 2,000° F. over a wavelength range of 585 nm to 595 nm. It can be seen that little deviation from a linear relationship is present. Performing a linear regression on this data yields a worst case deviation of 0.35 percent from a linear fit over the range 585 nm to 595 nm.

Figure 3:
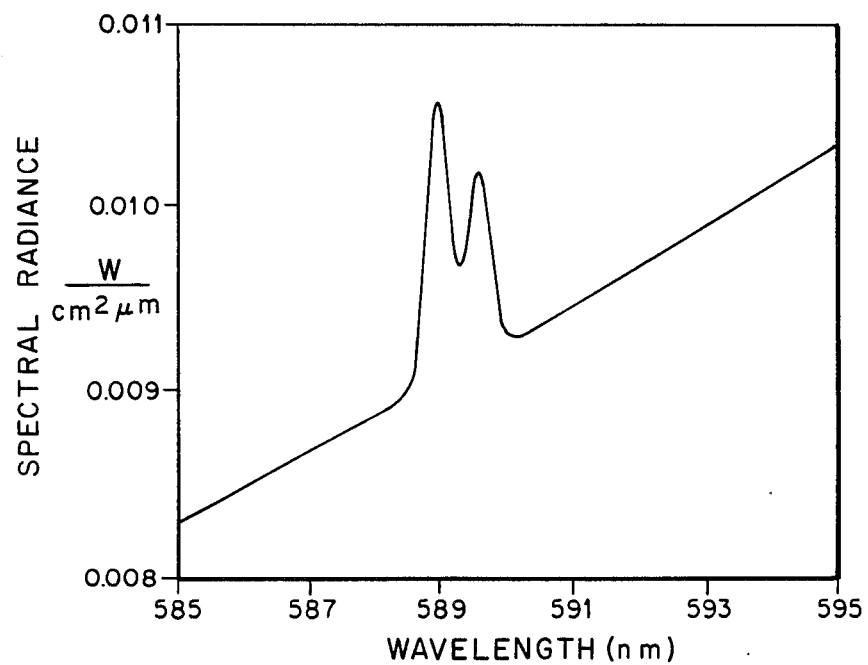
FIG. 3 is a graph illustrating the spectral radiance response of the combination of a sodium D-line emission from a combustion flame and the blackbody spectral radiance of FIG. 2.

Now if, for instance, one desires to observe sodium D-line emissions at 589.0 nm and 589.6 nm, the combined emissions and blackbody spectral radiance would resemble the plot shown in FIG. 3.

If one desires to measure the sodium emissions alone, an estimate of the blackbody radiation that falls within the spectral region of interest is needed. Taking advantage of the near-linear behavior of the blackbody radiation in the immediate vicinity allows such an estimate to be made. If the regions on either side of the sodium peaks are measured and summed, they will be directly proportional to the blackbody radiation at the sodium peaks.

This function is accomplished by the system described above. In order to separate the sodium D-line emission from the background, two light detectors are used. Detector 1 is filtered so that only a narrow region (3 nm) centered on the emission line 589 nm is passed as shown in FIG. 4.

Detector 2 is filtered to detect only light from narrow regions on either side of the 589 nm emission line as shown in FIG. 5. By adjusting the gains of amplifiers 39 and 41, connected to the outputs of detectors 1 and 2, respectively, so that the areas under both curves are equal, then detector 2 will indicate almost exactly the amount of background radiation reaching detector 1. By subtracting the signal at the output of amplifier 39 from that of amplifier 41 in instrument amplifier 35, a signal is obtained which is proportional to only the sodium emission of the flame being monitored and may be appropriately displayed on meter 37.

Tests have shown that both sodium D-line and potassium emissions in the flame of a coal-water fuel combustor may be detected in the presence of background emissions which are 200 times stronger. This corresponds to a signal-to-noise improvement of 23 dB and means that emissions only 0.5 percent as intense as the background radiation can be reliably detected and measured.

Thus, it will be seen that an optical emission monitor with background observation and cancellation has been provided which allows specific spectral emission line monitoring in the presence of interferring blackbody, or background radiation.

Although the invention has been described by means of a specific illustration it will be obvious to those skilled in the art that various modifications and changes may be made therein without departing from the spirit and scope of the invention as outlined in the following claims. For example, as higher operating temperature optical fiber cables are produced, the cable may be positioned within a combustor closer to the flame and conventional thermocouple lead, high pressure connectors may be used to penetrate the combustor pressure vessel, thereby eliminating the need for a window and the associated problems.

We claim:

1. An optical emission line monitoring system for remotely detecting a selected emission line from a light source in the presence of interferring background radiation, comprising:

a bifurcated fiber optic cable having first and second branches and a common trunk and adapted at the end of said first branch to optically couple light from said light source to said cable;

a first bandpass optical filter having a bandpass centered about and corresponding in width to said selected emission line and disposed to intercept light passing from the end of said common trunk of said cable and reflect light outside of said bandpass of said first filter back into said common trunk end of said cable;

a second bandpass optical filter having a bandpass centered about a wavelength identical to said first filter and a bandwidth substantially wider than the bandwidth of said first filter, said second filter disposed at the end of said second branch of said cable to view a portion of the light reflected back into said common trunk of said cable;

a first light detector means for generating a first signal having an amplitude proportional to the intensity of light transmitted through said first filter;

a second light detector means for generating a second signal having an amplitude proportional to the intensity of light transmitted through said second filter; and a differencing circuit means for subtracting said second signal from said first signal and generating an output signal having an amplitude proportional thereto so that said output signal is proportional to the intensity of said emission line being monitored.

2. The system as set forth in claim 1 wherein said differencing circuit means includes a first variable gain amplifier connected to the output of said first light detector, a second variable gain amplifier connected to the output of said second light detector and a differential amplifier having a positive input connected to the output of said first variable gain amplifier and a negative input connected to the output of said second variable gain amplifier.

3. The system as set forth in claim 1 wherein said light source is a combustion flame in a coal combustor, and wherein said interferring background radiation is blackbody radiation from within said combustor.

4. The system as set forth in claim 3 wherein said selected emission line is a sodium D-line emission from said flame.

5. The system as set forth in claim 4 wherein said first filter is a dichroic filter having a bandpass of about 3 nm centered about a wavelength of 589 nm and said second filter is a dichroic filter having a bandpass of about 10 nm centered about a wavelength of 589 nm.

6. The system as set forth in claim 5 wherein said first and second light detectors are photodiodes.

* * * * *